July 11, 1950 R. MILIK 2,514,715
CONVEYER BELT APPARATUS
Filed July 21, 1947 2 Sheets-Sheet 1
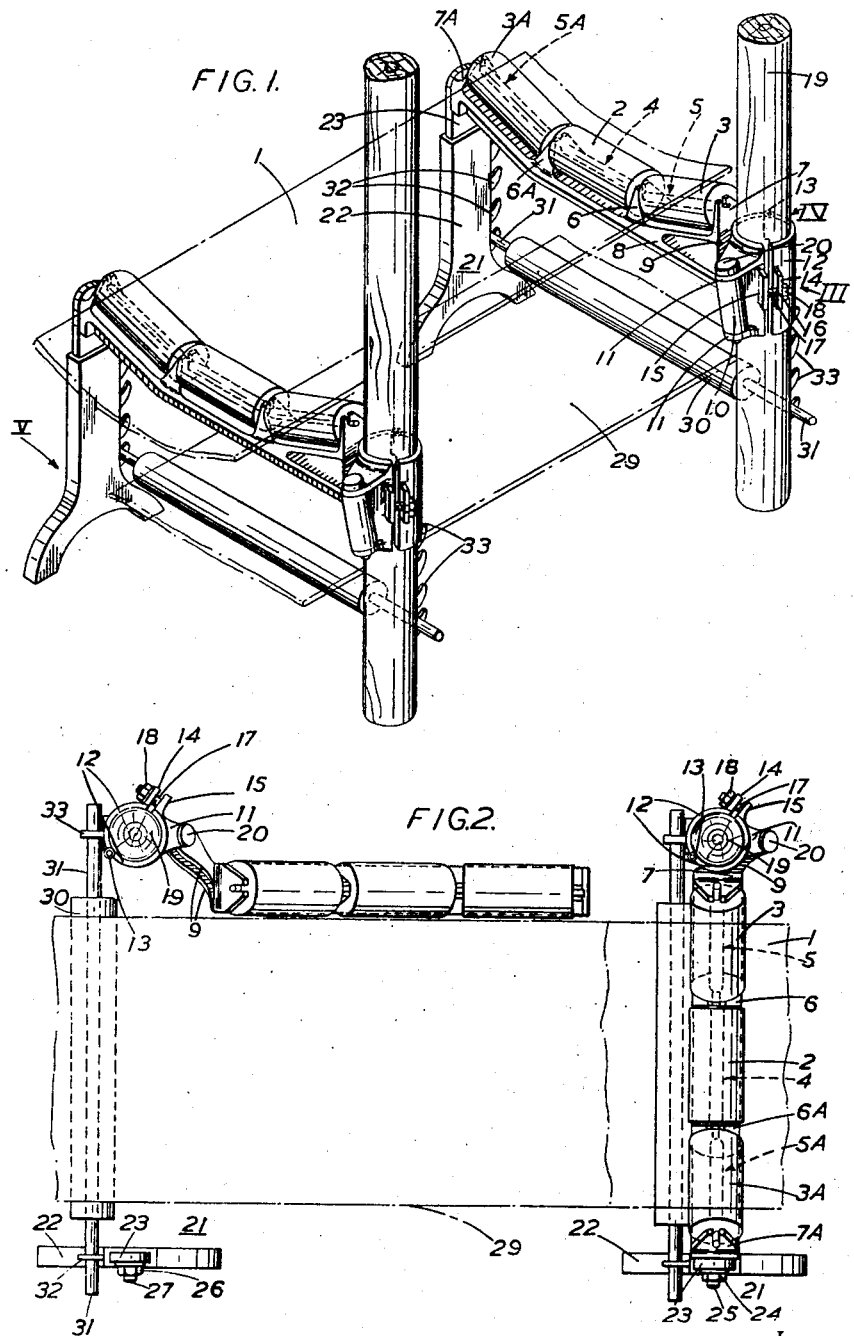
Inventor
R. Milik
By E. F. Wenderoth
Attorney

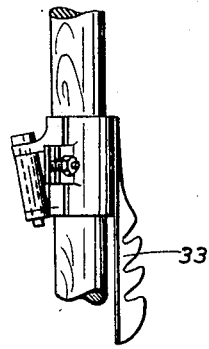
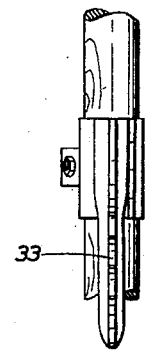
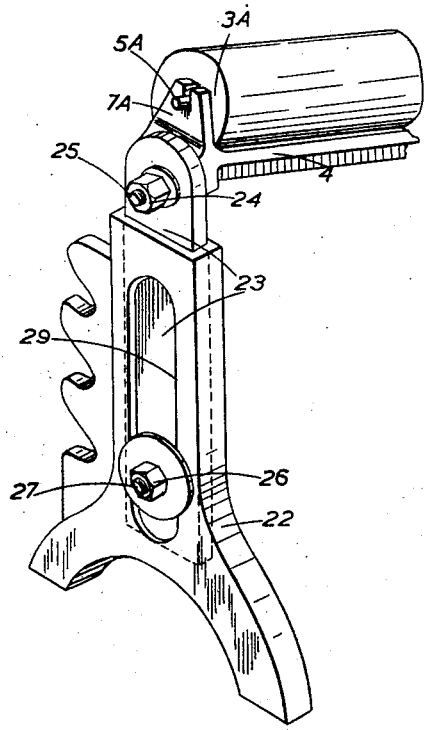

Patented July 11, 1950

2,514,715

UNITED STATES PATENT OFFICE 2,514,715

CONVEYER BELT APPARATUS

Rudolf Milik, London, England, assignor to Milik Conveyors Limited, London, England, a British company Application July 21, 1947, Serial No. 762,425
In Great Britain September 27, 1944

Section 1, Public Law 690, August 8, 1946
Patent expires September 27, 1964

10 Claims. (Cl. 198—192)

This invention relates to conveyor belt apparatus.

The main object of the invention is to provide improved apparatus for supporting travelling endless conveyor belts at intervals along their path of travel by transverse supporting rollers mounted on side posts or pit props as used, for example, in coal mines.

The usual method of providing progressive support for an extensible conveyor belt for use in mining and quarrying and similar operations requires that the conveyor be stopped while successive sections of supporting means carrying idler rollers are moved to the site and fixed in position.

It is, therefore, more particularly an object of this invention to provide improved roller supporting apparatus for enabling the supporting apparatus to be moved individually away from their belt supporting positions and back again without difficulty while the belt remains in motion and even if it is somewhat curved concavely or V-shaped owing to distortion by load.

Belt supporting idler rollers provided by this invention may thus be moved successively into position by a simple swinging motion, as the loading end of a belt is extended forward, and this operation may be performed without stopping a loaded belt, the reserve belt length being taken, for example, from a loop take-off in known manner.

According to the present invention each roller or set of rollers constituting a transverse support for the belt is mounted on a transversely extending arm or cradle which is pivotally mounted at one end to a side support or pedestal near one edge of the belt in such a manner that the said arm or cradle and its roller or set of rollers can be swung out of the transverse supporting position, whether or not the belt is in motion, about an axis slightly tilted from the vertical in a direction such that the outward movement is also a slightly downward movement.

It will be understood that by such a combined outward and downward movement the roller-carrying arm or cradle carries the roller or rollers clear of the underside of the belt even if the latter is sagging or somewhat V-shaped in cross section so that there is no frictional drag or hindrance offered by the belt.

In a preferred arrangement each roller-carrying arm carries a set of three rollers mounted thereon one of which, i. e. the central roller is horizontally disposed whilst the two outer rollers have their axes inclined towards the centre roller so as to provide a substantially flat-bottom troughed support for the belt. At one end the arm is shaped with two sleeve or "eye" portions to receive a hinge pin passing through two hinge-bearing lugs projecting from a bracket which is attachable to a side post or pedestal, the hinge bearing lugs being set at such an angle that the hinging axis is inclined slightly away from the vertical in a transversely outward and/or a longitudinally outward direction with respect to the belt. The other end of the cradle may be formed with a simple bearing pin or trunnion for support by a side post or pedestal near the other edge of the belt.

It will be understood that roller-carrying arms or cradles and supports therefor may be provided both for the bottom-run or return section of the belt as well as for the top-run or load-carrying section but that its advantage lies chiefly in the top-run, and that the return section of the belt may be carried, if desired, on simple cylindrical rollers mounted in simple bearings.

A fuller understanding of the invention may be had by reference to the following description of one practical embodiment of the invention, with the aid of the accompanying drawings, wherein:

Figure 1 is a pictorial view showing two devices according to the invention supporting a portion of a travelling endless conveyor belt, each device comprising a normally fixed single cylindrical roller for the bottom run of the belt and a set of three movable rollers for the top run of the belt.

Figure 2 is a plan view thereof, showing the top-run section of one of the belt supporting devices swung clear of the underside of the belt.

Figure 3 is a fragmentary side elevation viewed in the direction of the arrow III, Figure 1.

Figure 4 is a fragmentary end elevation viewed in the direction of arrow IV, Figure 1, and Figure 5 is a side perspective view in the direction of arrow V, Figure 1, of one of the pedestal brackets employed for supporting the outer end of the arm.

In the embodiment illustrated the top run 1 of the transversely flexible conveyor belt is supported so as to form a trough of shallow V-section upon sets of rollers, each comprising a central roller 2 and a pair of outer rollers 3, 3A oppositely and downwardly inclined toward the central roller 2. These three rollers 2, 3 and 3A are freely revolubly mounted by their spindles 4, 5 and 5A respectively between a pair of inner bearing blocks 6, 6A and a pair of outer bearing blocks 7, 7A provided on an arm 8. From one end of the arm 8 outwardly extends a forked extension 9 terminating in a sleeve 10 and this sleeve 10 is adapted to be received between a pair of apertured lugs 11 provided on one half of a two-part split collar 12. The two halves of the split collar 12 are hingedly connected by a pin 13 and adjoining the meeting edges of the collar halves are outwardly extending lugs 14, 15. The lug 14 is formed with a gap 16 in its outer edge and the lug 15 has welded thereto a bolt 17 carrying a fixing nut 18, so that the two halves of the split collar 12 may be swung open to receive a timber pit prop 19 and then closed to embrace said prop 19, the collar 12 being held in the closed position by tightening the nut 18 on the bolt 17 which has entered the gap 16. The collar 12 may thus be clamped to the pit prop 19 or to an equivalent post member at the required height above floor level.

The arm 8 is hingedly supported in cantilever fashion on the split collar 12 by a common hinge pin 20 passing through the apertured lugs 11 of the collar 12 and the sleeve 10 of the arm 8 and by reason of the unequal lengths of the prongs of the forked extension 9 of said arm 8 and the positions of the lugs 11 in relation to the vertical bore of the split collar 12 the axis of the hinge pin 20 is tilted out of the vertical, that is, the upper end of the hinge pin 20 leans away from the edge of the upper run 1 of the belt and, also as shown in Figure 3, away from the collar 12 in a direction parallel to the direction of run of the belt. The rollers, 3, 3A are preferably equally inclined to the central roller 2, which is substantially horizontal when the arm 8 is in the belt-supporting position, and in order to clear the underside of a flat-bottomed V-troughed belt run 1 the axis of the arm hinge pin 20 in a transverse direction should be approximately perpendicular, that is, preferably not less than a right angle, to the longitudinal axis of the outer roller 3A.

The outer end of the cantilever arm 8 is shown supported by a separate pedestal bracket 21. In the form of bracket illustrated there is provided a hollow base member 22 within which a narrow plate 23 is vertically slidable so as to be adjustable as required to suit the height of the outer end of the cantilever arm 8. The arm 8 has welded thereto a screwed bolt 25 which passes through an opening in the slidable plate 23, so that said arm 8 can be secured to the slidable plate 23 by means of a nut 24 which is screwed onto said bolt 25. The plate 23 may be retained in the height-adjusted position by means of a nut 26 screwed on to a bolt 27 which is welded to said plate 23 and extends through a vertical slot in the base 22.

For supporting the bottom run 29 of the belt a single straight cylindrical roller 30 (as shown) or a plurality of axially aligned horizontal rollers is freely revolubly mounted on a transverse spindle 31 supported below the arm 8. The spindle 31 rests by one end of a rack 32 forming part of the pedestal 22, and by the other end on a rack 33 forming part of the collar 12.

I claim:

1. Apparatus for supporting a travelling conveyor belt at intervals along its path of travel, comprising a bracket adapted to be mounted near one edge of the belt to be supported, an arm hingedly mounted at one end to said bracket, and at least one roller freely revolubly mounted on said arm to constitute normally a transverse support for the belt, said arm being so mounted on said bracket as to permit it to be swung out of the transverse supporting position, whether or not the belt is in motion, about an axis slightly tilted from the vertical in a direction such that the outward movement is also a slightly downward movement.

2. Apparatus as claimed in claim 1, wherein the arm is supported in cantilever fashion by the bracket.

3. Apparatus as claimed in claim 1, wherein an auxiliary support is provided upon which to rest the outer end of the hinged roller-carrying arm when said arm is in the normal belt supporting position.

4. Apparatus as claimed in claim 1, wherein the bracket for the hinged end of the arm is constructed so as to be adjustable as to height.

5. Apparatus as claimed in claim 1, characterised in that the bracket is of collar form and is adapted to be slidably mounted on an erect post.

6. Apparatus as claimed in claim 1, characterised in that the bracket is in the form of a two-part hinged collar, and is adapted to be clamped around a post.

7. Apparatus as claimed in claim 1 wherein the top run of the belt is supported in shallow trough form by at least two rollers inclined to one another.

8. Apparatus as claimed in claim 1, wherein the top run of the belt is supported in shallow trough form by three rollers, the centre roller normally horizontally disposed and the two outer rollers inwardly and downwardly inclining toward said centre roller.

9. Apparatus as claimed in claim 1, characterised in that the axis of hinging of the roller-carrying arm, in a transverse direction, is disposed substantially perpendicular to the longitudinal axis of the outermost roller.

10. Apparatus for supporting a travelling conveyor belt at intervals along its path of travel, comprising a bracket adapted to be mounted near one edge of the belt to be supported, an arm hingedly mounted at one end of said bracket, and at least one roller freely revolubly mounted on said arm to constitute normally a transverse support for the belt, said arm being so mounted on said bracket as to permit it to be swung out of the transverse supporting position, whether or not the belt is in motion, about an axis slightly tilted from the vertical in a direction such that the outward movement is also a slightly downward movement, and a pedestal adapted to be mounted near the outer edge of the belt to be supported, said pedestal carrying a vertically adjustable element constituting a support for the outer end of the arm swingably mounted on said bracket.

RUDOLF MILIK.

REFERENCES CITED

The following references are of record in the file of this patent:

UNITED STATES PATENTS

| Number | Name | Date |
| --- | --- | --- |
| 1,760,304 | Feldin | May 27, 1930 |